US011281699B2

(12) United States Patent
Nakamori et al.

(10) Patent No.: US 11,281,699 B2
(45) Date of Patent: Mar. 22, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Yuta Nakamori, Tokyo (JP); Kengo Tokuchi, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 16/918,364

(22) Filed: Jul. 1, 2020

(65) Prior Publication Data

US 2021/0240740 A1 Aug. 5, 2021

(30) Foreign Application Priority Data

Feb. 4, 2020 (JP) .............................. JP2020-016889

(51) Int. Cl.
| G06F 17/00 | (2019.01) |
| G06F 16/28 | (2019.01) |
| G06F 9/54 | (2006.01) |
| G06F 16/176 | (2019.01) |
| G06F 16/93 | (2019.01) |

(52) U.S. Cl.
CPC ............ *G06F 16/285* (2019.01); *G06F 9/542* (2013.01); *G06F 16/176* (2019.01); *G06F 16/93* (2019.01)

(58) Field of Classification Search
None
See application file for complete search history.

(56) References Cited

U.S. PATENT DOCUMENTS

| 5,819,295 A | 10/1998 | Nakagawa et al. |
| 9,419,820 B1* | 8/2016 | Liang .................... G06Q 50/01 |
| 10,146,777 B2* | 12/2018 | Tseng .................... G06F 16/275 |
| 2008/0070209 A1* | 3/2008 | Zhuang ................ G06Q 30/02 434/236 |
| 2008/0104225 A1* | 5/2008 | Zhang .................... H04L 67/306 709/224 |
| 2011/0060712 A1* | 3/2011 | Harashima ......... G06F 16/3344 706/47 |
| 2011/0061066 A1* | 3/2011 | Ogawa ................ G06F 9/44521 719/328 |
| 2013/0198663 A1* | 8/2013 | Matas ................. G06F 3/04842 715/765 |
| 2016/0371378 A1* | 12/2016 | Fan ........................ H04L 67/10 |

FOREIGN PATENT DOCUMENTS

| JP | H07-78186 A | 3/1995 |
| JP | H09-128380 A | 5/1997 |
| JP | 2000-268041 A | 9/2000 |
| JP | 2011-242937 A | 12/2011 |

* cited by examiner

*Primary Examiner* — Hasanul Mobin
(74) *Attorney, Agent, or Firm* — Oliff PLC

(57) ABSTRACT

An information processing apparatus includes a processor configured to acquire structured information created by a first user and structured information created by a second user, the structured information including structured contents and in accordance with the acquired structured information, suggest a content as a linking destination of a new content when the new content is incorporated in the structured information created by the first user.

14 Claims, 7 Drawing Sheets

| STRUCTURED INFORMATION ID | CREATOR | DATE OF CREATION |
|---|---|---|
| 0001 | USER A | 1/23/2020 10:00 |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-016889 filed Feb. 4, 2020.

BACKGROUND

(i) Technical Field

The present disclosure relates to an information processing apparatus and a non-transitory computer readable medium.

(ii) Related Art

Japanese Unexamined Patent Application Publication No. 2000-268041 discloses a document file sharing system that allows multiple clients to share a document file via a server. The document file sharing system includes a unit that holds multiple classification systems respectively corresponding to multiple classification perspectives in the shared file and a unit that searches the held classification systems for a classification system corresponding to a classification perspective the client has specified in the server.

A large volume of file may be distributed in a personal computer, smart phone, or server. Techniques to automatically structure the large volume of file later in accordance with details of the file are available but the structure implemented may not suit the preference of users.

SUMMARY

Aspects of non-limiting embodiments of the present disclosure relate to provide an information processing apparatus and non-transitory computer readable medium to suggest incorporation of a new content in structured information of a user when the user adds the new content.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus. The information processing apparatus includes a processor. The processor is configured to acquire structured information created by a first user and structured information created by a second user, each piece of the structured information including structured contents and suggest a content as a linking destination of a new content when the new content is incorporated in the structured information created by the first user in accordance with each piece of the acquired structured information.

BRIEF DESCRIPTION OF THE DRAWINGS

Exemplary embodiment of the present disclosure will be described in detail based on the following figures, wherein.

DETAILED DESCRIPTION

Figure 1:
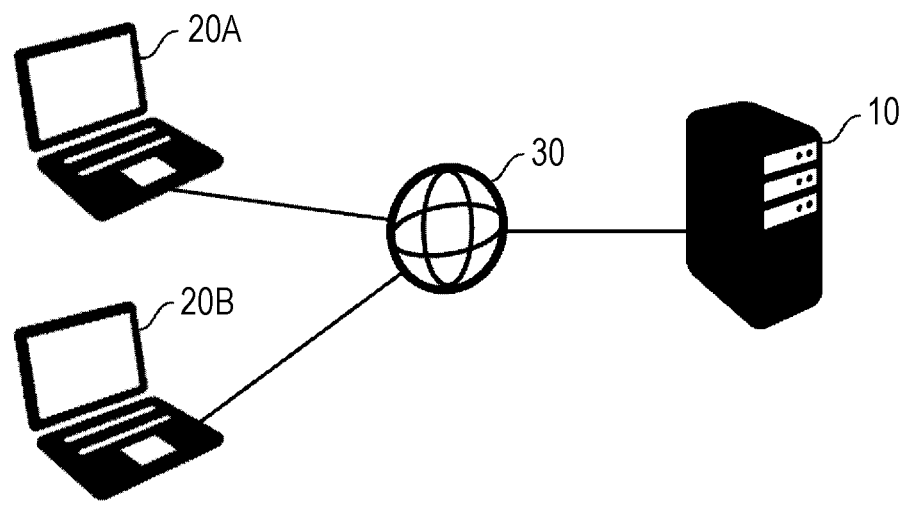
FIG. 1 schematically illustrates an information processing system of an exemplary embodiment.

Exemplary embodiment of the disclosure is described with reference to the drawings. Note that identical or equivalent elements are designated with the same reference numerals. In the drawings, figures are not drawn to scale.

How the exemplary embodiment of the disclosure has been developed by the inventor is described first.

Humans think by systematizing a number of events and then tracking the events systematically. Given the same event as a start point, the tracking of the events may be different from person to person. The systematization of the events may be performed through human subjectivity.

A number of techniques of systematizing many events in accordance with a predetermined rule have been disclosed. For example, one available technique analyzes the details of a document, extracts key words characteristic of the document, and expresses, in a network diagram, cooccurrence relation of the extracted key words. The cooccurrence relation of the key words is expressed in the network diagram in accordance with the predetermined rule. The network diagram is created based on objective judgement rather than human subjectivity.

As described above, the systematization of the events is performed in accordance with human subjectivity. The results of the systematization are thus different from person to person. If the events systematized in the head of another person are visualized and obtained as information, this may serve as a hint when a person systematizes a large number of events.

The exemplary embodiment of the disclosure has thus been reached and addresses providing awareness in the systematization of the events in accordance with the visualization of the events systematized in the head of another person.

FIG. 1 schematically illustrates an information processing system of an exemplary embodiment. FIG. 1 illustrates a server 10, serving as an information processing apparatus, and user terminals 20A and 20B.

The server 10 manages information into which contents are structured (structured information) and schematically presents the structured information on the user terminals 20A and 20B. As described in detail below, in the exemplary embodiment, the structured information represents multidimensionally a relationship of the contents. The contents are structured in accordance with a predetermined rule, such as in a cooccurrence network. In accordance with the exemplary embodiment, however, the structured information managed by the server 10 is created in accordance with subjective judgement of each user. In accordance with the exemplary embodiment, the server 10 has a function of receiving from the user terminals 20A and 20B an input related to the creation of the structured information and presenting the structured information in response to the received input. The user terminals 20A and 20B may receive, from users, inputs related to different pieces of the structured information.

The user terminals 20A and 20B are connected to the server 10 via a network 30, such as the Internet or intranet, and receives from a user an input related to the creation of the structured information. The user terminals 20A and 20B are used respectively by different users. Referring to FIG. 1, two user terminals are illustrated. The number of user terminals is not limited to two in the information processing system. Each of the user terminals 20A and 20B may be any device having the function of being connected to the network 30 and, for example, may be a personal computer, smart phone, or tablet terminal. In the following discussion, the user terminals 20A and 20B are collectively referred to as a user terminal 20 if it is not necessary to discriminate one from the other.

Figure 2:
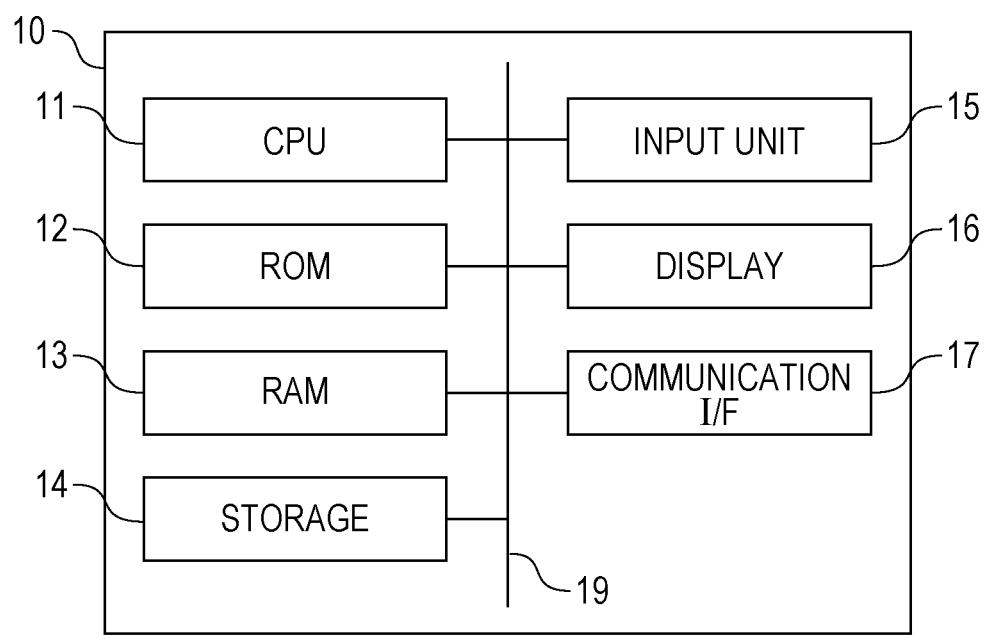
FIG. 2 is a block diagram illustrating a hardware configuration of a server.

FIG. 2 is a block diagram illustrating a hardware configuration of the server 10.

Referring to FIG. 2, the server 10 includes a central processing unit (CPU) 11, read-only memory (ROM) 12, random-access memory (RAM) 13, storage 14, input unit 15, display 16, and communication interface (I/F) 17. These elements are communicably interconnected to each other via a bus 19.

The CPU 11 executes a variety of programs and controls the elements of the server 10. Specifically, the CPU 11 reads a program from the ROM 12 or the storage 14 and executes the program using the RAM 13 as a working area. In accordance with the program stored on the ROM 12 or the storage 14, the CPU 11 controls the elements and perform a variety of arithmetic operations. In accordance with the exemplary embodiment, the ROM 12 or the storage 14 stores a structured information presentation program that presents the structured information to the user terminal 20.

The ROM 12 stores a variety of programs and a variety of data. The RAM 13 temporarily stores program and data. The storage 14 includes a hard disk drive (HDD), solid-state drive (SSD), or flash memory, and stores a variety of programs including an operating system and a variety of data.

The input unit 15 includes a pointing device, such as a mouse, and a keyboard and is used to enter a variety of inputs.

For example, the display 16 is a liquid-crystal display and displays a variety of information. the display 16 may be of a touch-panel type and function as the input unit 15.

The communication I/F 17 is used to communicate with another device, such as the user terminal 20 and may comply with Ethernet (registered trademark), fiber-distributed data interface (FDDI), or Wi-Fi (registered trademark).

When the structured information presentation program is executed, the server 10 implements a variety of functions using the hardware resources described above. The functional configuration of the server 10 is described below.

The functional configuration of the server 10 is described below.

Figures 3, 4:
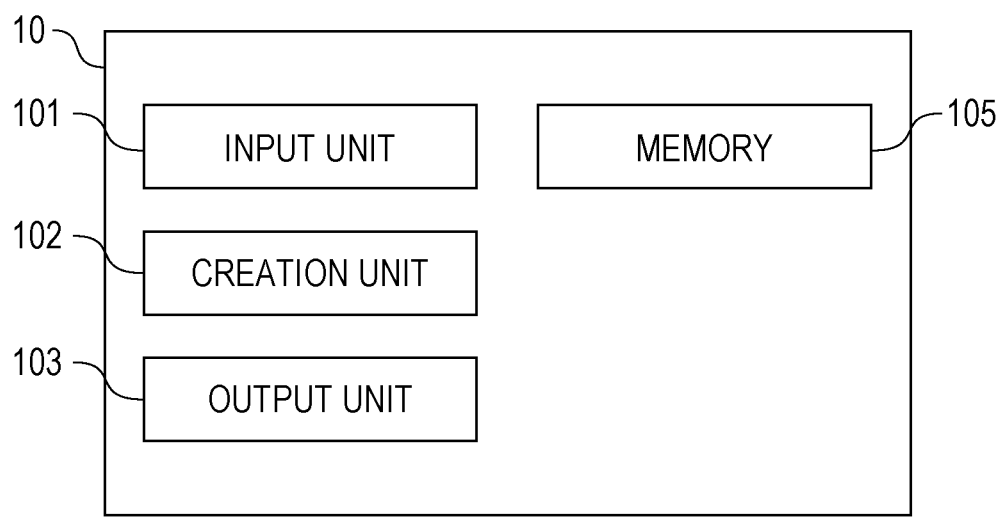
FIG. 3 is a functional block diagram illustrating the server.
FIG. 4 illustrates an example of a structured information table stored on a memory.

FIG. 3 is a functional block diagram illustrating the functional configuration of the server 10.

Referring to FIG. 3, the server 10 includes in the functional configuration thereof an input unit 101, creation unit 102, output unit 103, and memory 105. The functional configuration is implemented when the CPU 11 reads and executes the structured information presentation program from the ROM 12 or the storage 14.

The input unit 101 receives from the user terminal 20 a user input related to the creation of the structured information. The input related to the creation of the structured information relates to the setting of an item, linking between items, and the like. The item may be created in the form of a file. The file stores document data, image data, voice data, and other data. The item may be created in the form of a folder. The server 10 displays on the screen of the user terminal 20 a user interface used to create the structured information. The input unit 101 receives information related to the structured information that is created on the user interface of the user terminal 20 by user key and mouse operations. In addition to receiving the information responsive to the user key and mouse operations, the input unit 101 may read information stored on a hard disk (the hard disk may be the one built in a computer or the one connected to the input unit 101 via a network).

The creation unit 102 creates the structured information in response to the input received by the input unit 101. For example, in response to a user edit operation received by the input unit 101, the creation unit 102 edits, adds, or deletes an item, and modifies, adds, or deletes a relationship line between items, and edits the attribute of the relationship line between the items in terms of intensity, direction or the like.

The output unit 103 outputs the structured information created by the creation unit 102. The output destination of the structured information is the user terminal 20 that has received from the user the input related to the creation of the structured information. The output unit 103 causes the memory 105 to store the information related the structured information created by the creation unit 102.

According to the exemplary embodiment, in accordance with each piece of the structured information, the output unit 103 suggests an item serving as a linking destination (linking destination item) when a new item is introduced in the structured information created by the user. In the suggestion of the linking destination item, the output unit 103 suggests the linking destination item in accordance with an item that is present in the structured information created by another user is linked with the new item to be added.

When the linking destination item is suggested, the output unit 103 may calculate a score of each item using the details of the structured information created by the other user and suggest the linking destination item of the new item in accordance with the calculated score of each item. The score may be calculated such that the score of the linking destination item is higher as the number of users linked is larger in the structured information created by the other user.

In the suggestion of the linking destination item, the output unit 103 may suggest the linking destination item of the new item in accordance with an amount of evaluation that is performed on the linking of the item related to the new item. In the suggestion of the linking destination item, the output unit 103 may suggest the linking destination item of the new item in accordance with results of analyzing the details of the new item.

The output unit 103 may present the structured information created by a user in a manner that discriminates the structured information created by the user from the structured information created by another user. For example, the output unit 103 may discriminate in the presentation the structured information created by the user from the structured information created by the other user by making different the thickness, color, or type of a linking line.

The memory 105 stores a variety of information related to the operation of the server 10. In accordance with the exemplary embodiment, the memory 105 stores, as an example of the information related to the operation of the server 10, information related to the structured information. The information related to the structured information has a data structure used to create the structured information.

FIG. 4 illustrates an example of a structured information table 400 stored on the memory 105. Referring to FIG. 4, the structured information table 400 includes a structured information identification (ID) column, creator column, and date of creation column. The structured information ID column holds an identifier uniquely identifying the structured information. The creator column holds information on a user who has created the structured information. The date of creation column holds information on a date on which the structured information has been created.

Figure 5:
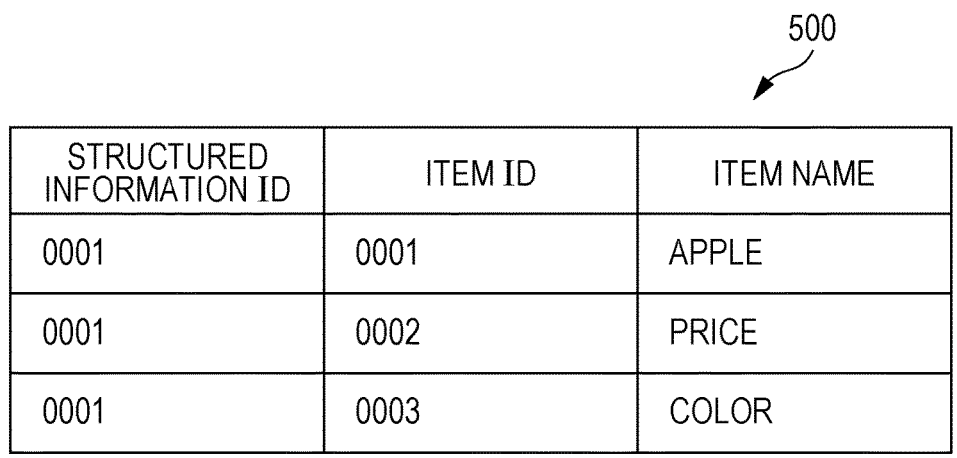
FIG. 5 illustrates an example of an item information table stored on the memory.

FIG. 5 illustrates an example of an item information table 500 stored on the memory 105. Referring to FIG. 5, the item information table 500 includes a structured information ID column, item ID column, and item name column. The structured information ID column holds an identifier uniquely identifying the structured information and corresponds to the structured information ID column in the structured information table 400. The item ID column holds an identifier identifying an item. An item is uniquely identified by the identifier at the structured information ID column and the identifier at the item ID column. The item name column holds the name of the item.

Figure 6:
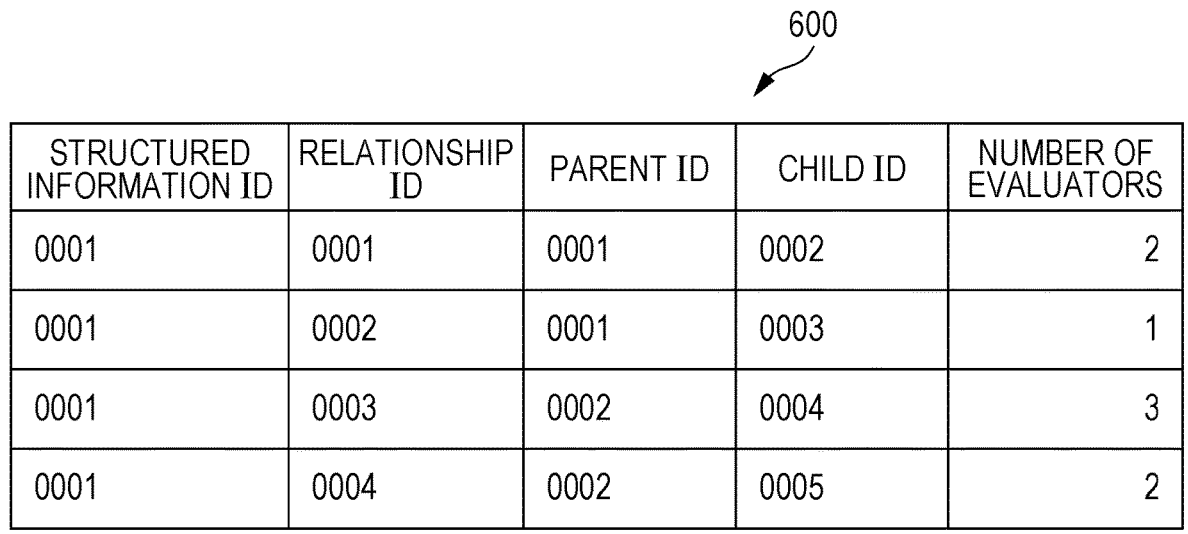
FIG. 6 illustrates an example of a relationship information table stored on the memory.

FIG. 6 illustrates an example of a relationship information table 600 stored on the memory 105. Referring to FIG. 6, the relationship information table 600 includes a structured information ID column, relationship ID column, parent ID column, child ID column, and number of evaluators column. The structured information ID column holds an identifier that uniquely identifies the structured information. The structured information ID column corresponds to the structured information ID column in the structured information table 400. The relationship ID column holds an identifier that identifies a relationship meaning the linking of the items. An item is uniquely identified by an identifier at the structured information ID column and an identifier at the relationship ID column. The parent ID column holds an item ID of an item serving as a parent of the relationship. The child ID column holds an item ID of an item serving as a child of the relationship. The number of evaluators column holds the number of users who have evaluated the relationship.

The operation of the server 10 is described below.

Figure 7:
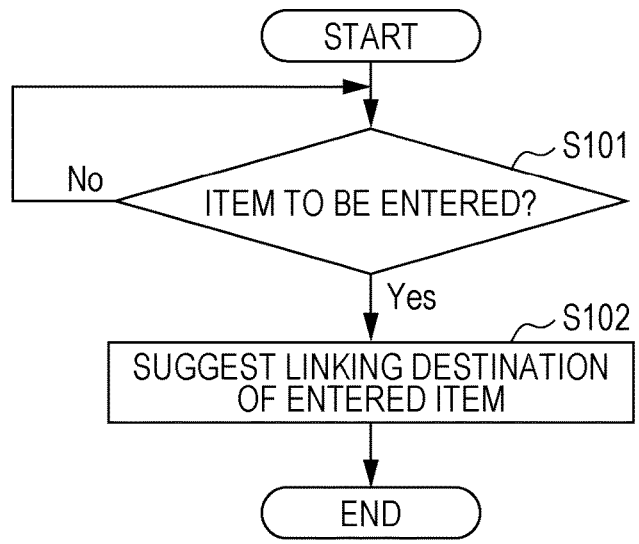
FIG. 7 is a flowchart illustrating a structured information presentation process performed by the server.

FIG. 7 is a flowchart illustrating a structured information presentation process performed by the server 10. The CPU 11 performs the structured information presentation process by reading a structured information presentation program from the ROM 12 or storage 14 and executes the structured information presentation program by expanding it on the RAM 13.

The CPU 11 waits on standby until the user terminal 20 enters an item related to the structured information (step S101).

When the user terminal 20 enters an item related to the structured information (yes path from step S101), the CPU 11 suggests an item as a linking destination of the input item (step S102). The CPU 11 suggest the linking destination item in accordance with an item that is in the structured information created by another user and is linked with the newly added item.

The server 10 performs the process in FIG. 7. When the user adds a new item, the server 10 may thus suggest the introduction of the new item into the structured information of the user using the structured information created by the user and the structured information created by the other user.

Examples of the structured information created by the user are described below.

Figure 8:
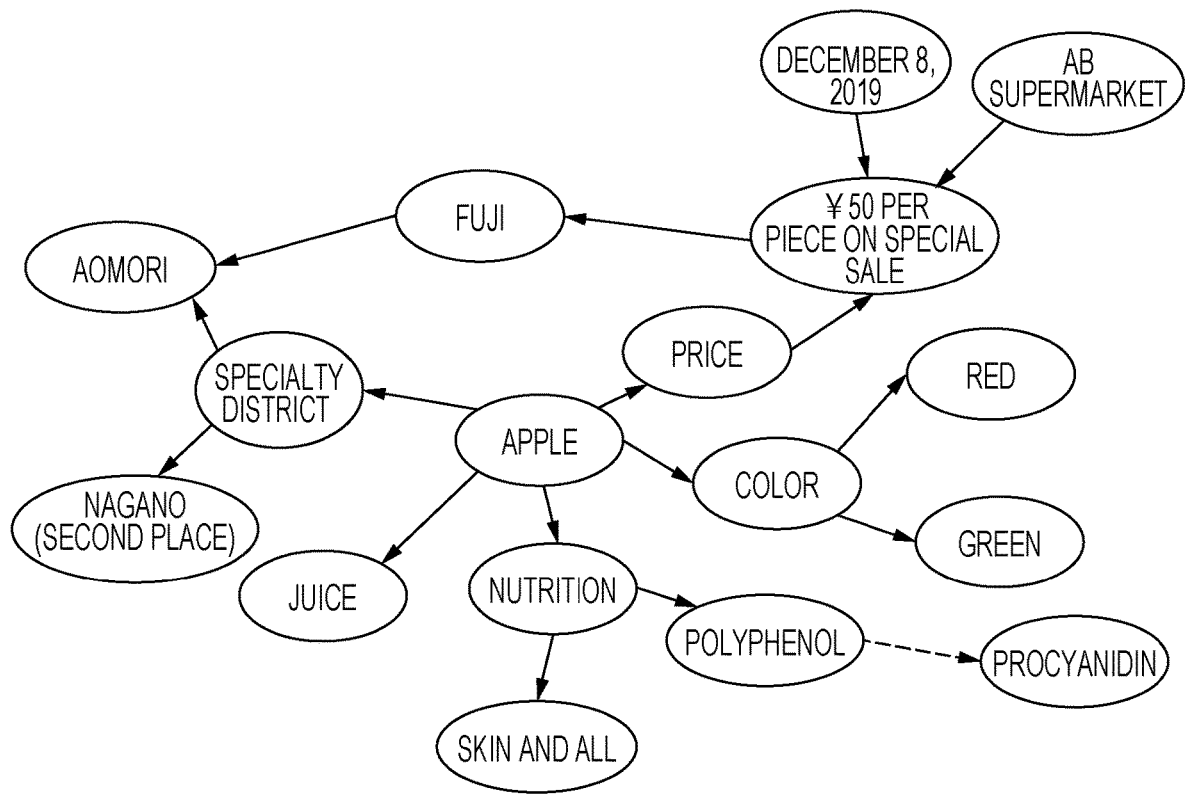
FIG. 8 illustrates an example of structured information created by a user.
Figure 9:
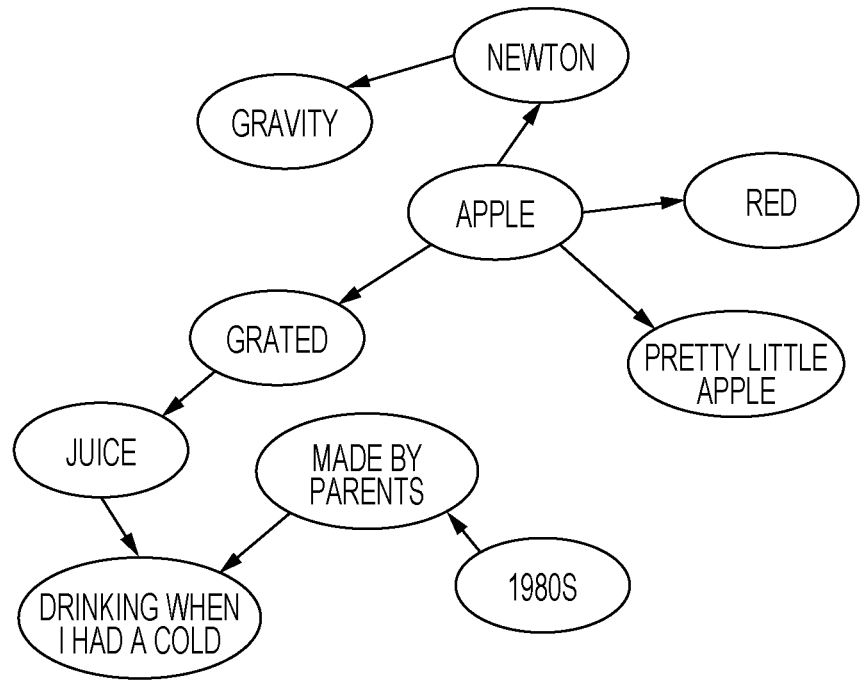
FIG. 9 illustrates an example of the structured information created by the user.
Figure 10:
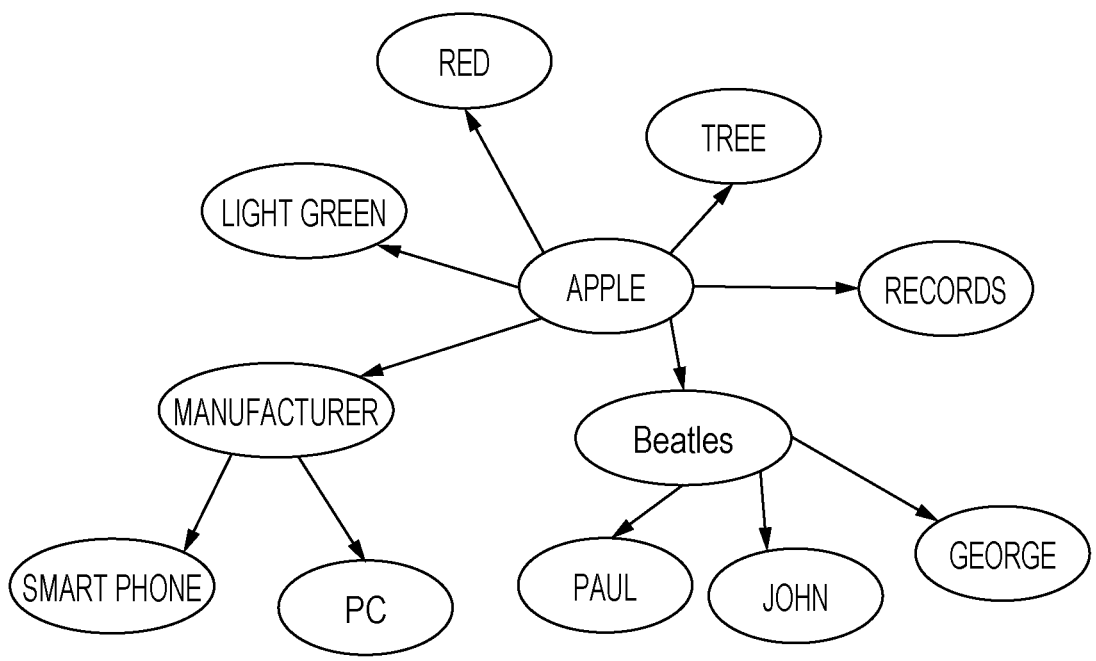
FIG. 10 illustrates an example of the structured information created by the user.

FIGS. 8 through 10 illustrate examples of the structured information created by users. FIG. 8 illustrate an example of the structured information a user A has created around an item "apple". FIG. 9 illustrate an example of the structured information a user B has created around the item "apple". FIG. 10 illustrate an example of the structured information a user C has created around the item "apple". In each piece of the structured information, an arrow denotes a parent-child relationship. Each piece of the structured information is subjectively created by the respective user.

In the structured information in FIG. 8, not an arrow-headed solid line but an arrow-headed broken line is drawn between "polyphenol" and "procyanidin". This indicates the state in which the user A puts on hold the determination of the relationship between polyphenol and procyanidin. The server 10 may present the structured information in this way in a manner that discriminates the state in which the linking between the items in the structured information is put on hold from the state in which the items are linked. If the on-hold state is maintained, the server 10 may display the broken line in a lighter color with time. If a predetermined period of time has elapsed in the on-hold state, the server 10 may erase the broken line and cancel the item linking.

Each piece of the structured information is created through user subjectivity. If the creation of the structured information starts with the item apple, the details of the structured information are substantially different from user to user as illustrated in FIGS. 8 through 10. The server 10 may assist one user to create the structured information in accordance with the structured information created by another user.

For some items, the structured information created by one user has a parent-child relationship but the structured information created by another user does not have the parent-child relationship. For example, in the structured information created by the user A in FIG. 8, there is no direct parent-child relationship between "apple" and "red". In the structured information created by the user B in FIG. 9 and the structured information created by the user C in FIG. 10, the direct parent-child relationship is established between apple and red.

When the user A acquires the structured information in FIG. 8 from the server 10 and displays the structured information on the user terminal 20, the server 10 may suggest that a direct relationship be set between apple and red.

Figure 11:
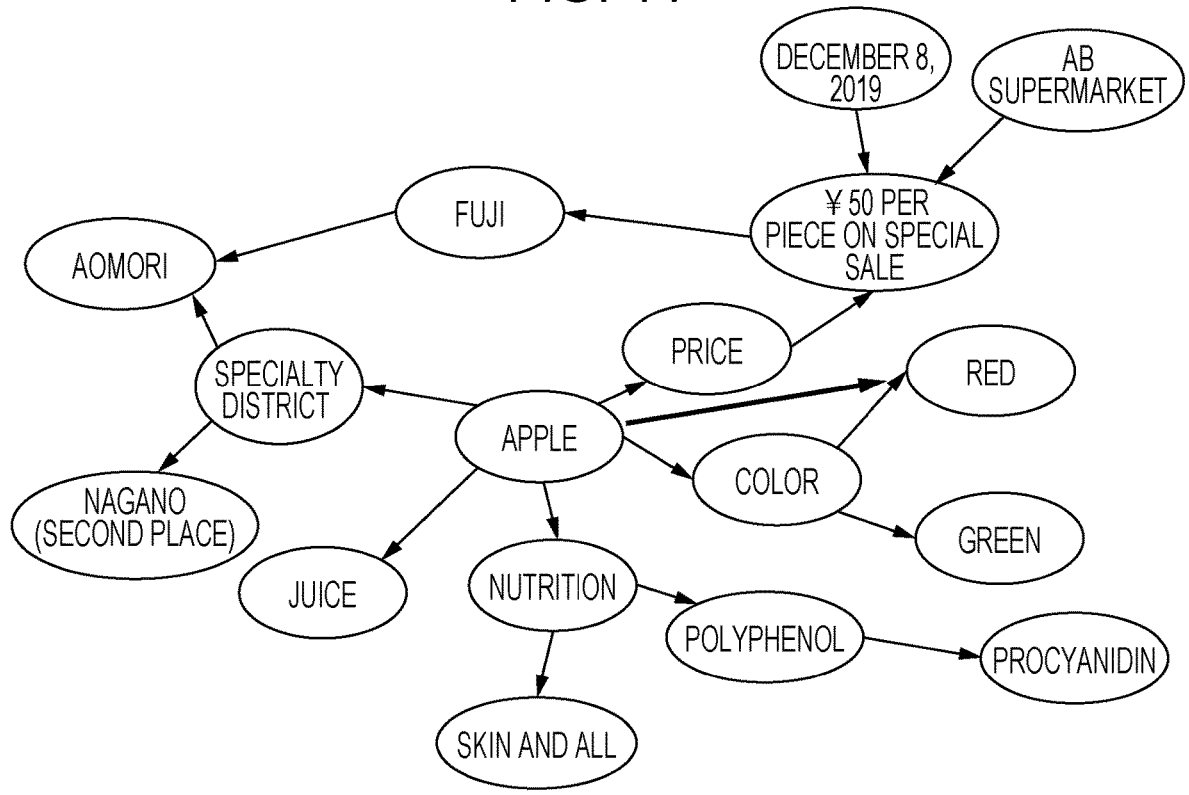
FIG. 11 illustrates an example of the structured information created by the user.

FIG. 11 illustrates an example of the structured information the user A has created around the item "apple". Referring to FIG. 11, the server 10 suggests setting of the direct parent-child relationship between the item apple and the item red with an arrow-headed thick line. The user A subjectively determines whether to accept the suggestion from the server 10.

When the user adds a new item to the structured information, the server 10 suggests a linking destination of the added item in accordance with the structured information of another user.

Figure 12:
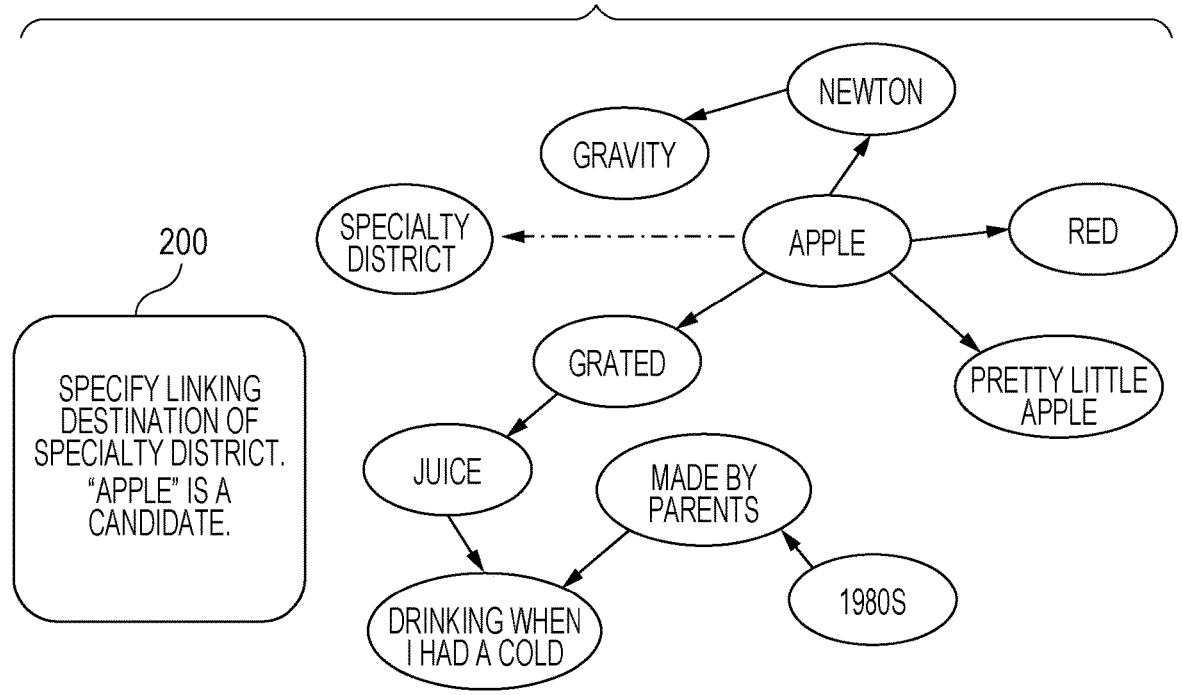
FIG. 12 illustrates an example of the structured information created by the user.

FIG. 12 illustrates an example of the structured information the user B has created around the item "apple". Referring to FIG. 12, the user has added an item "specialty district". In view of the structured information created by the user A, the parent-child relationship is established between apple and specialty district. In accordance with information related to the structured information stored on the memory 105, the server 10 suggests apple as a linking destination candidate of specialty district and presents a message 200 related to the suggestion. Whether to accept the suggestion by the server 10 is subjectively determined by the user B. When the server 10 suggests a linking destination candidate, the server 10 may use text or voice.

In the suggestion of an item serving as a linking destination, the server 10 may suggest the linking destination item of a new item in accordance with an amount of evaluation that has been performed on the linking of the item related to the new item in the structured information created by another user. For example, the server 10 may suggest as a linking destination of the new item an item having an amount of evaluation exceeding a predetermined threshold.

An arrow denoting structuring (structuring arrow) is managed in accordance with information related to the structured information stored on the server 10. A single person may have and use multiple structuring arrows. For example, when the history of a job is created, the user may extract a related file using attribute information on a structuring arrow created for the history of the job. Specifically, a blue arrow may be for private use, a purple arrow may be for a structured file for the history of job and those pieces of information may be stored on the server 10.

If the attribute information is provided in the form of an arrow, the server 10 may add the attribute information of the arrow to a content of a corresponding file. For example, when the user operates to cancel the arrow, the server 10 may cause the user to select between deleting the attribute information as a content and leaving the attribute information as the past history.

A file may be shared on a cloud. When a new content is added, the server 10 may understand the meaning of the content from the file name, text, or drawing of the content even if the content is a structured document unknown to the present user. The server 10 may automatically determine the attribute structured in the content to be a tentative candidate. Whether the attribute that the server 10 has determined to be the tentative candidate is acceptable or not is subjectively determined by the user.

The structured information stored for the content on the server 10 may be not only information that describes the parent-child relationship but also information describing linking structuring multiple tiers at an upper or lower level. For example, in a company a large number of rules are formulated at multiple tiers, from company policy to regulations to rules.

The server 10 may impart color or shape to an icon image of a file or add an additional image to the icon image such that non-structured content created by the user is not present and that the non-structured content and structure content are visibly discriminated. If the non-structured contents are accumulated and exceeds a specific amount, the server 10 may report the number and names of non-structured contents and issue a warning to urge structuring.

Figure 13:
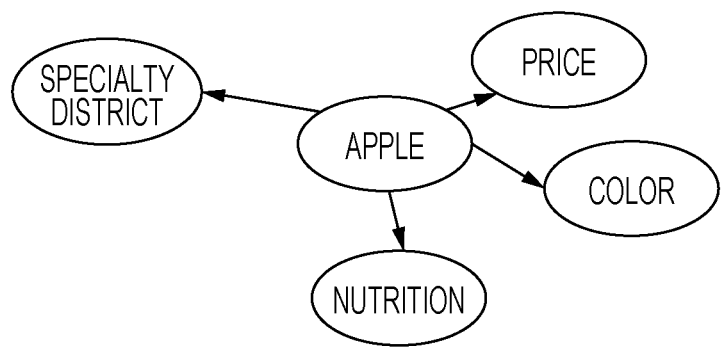
FIG. 13 illustrates an example of item search results provided by the server.

The server 10 may allow the user to search for an item in accordance with the structured information. For example, the server 10 may allow the user to search for the item by specifying the number of tiers. FIG. 13 illustrates an example of item search results by the server 10 in the structured information created by the user A. Referring to FIG. 13, when the user A specifies "apple", the server 10 searches items one tier below and presents the hit items.

Figure 14:
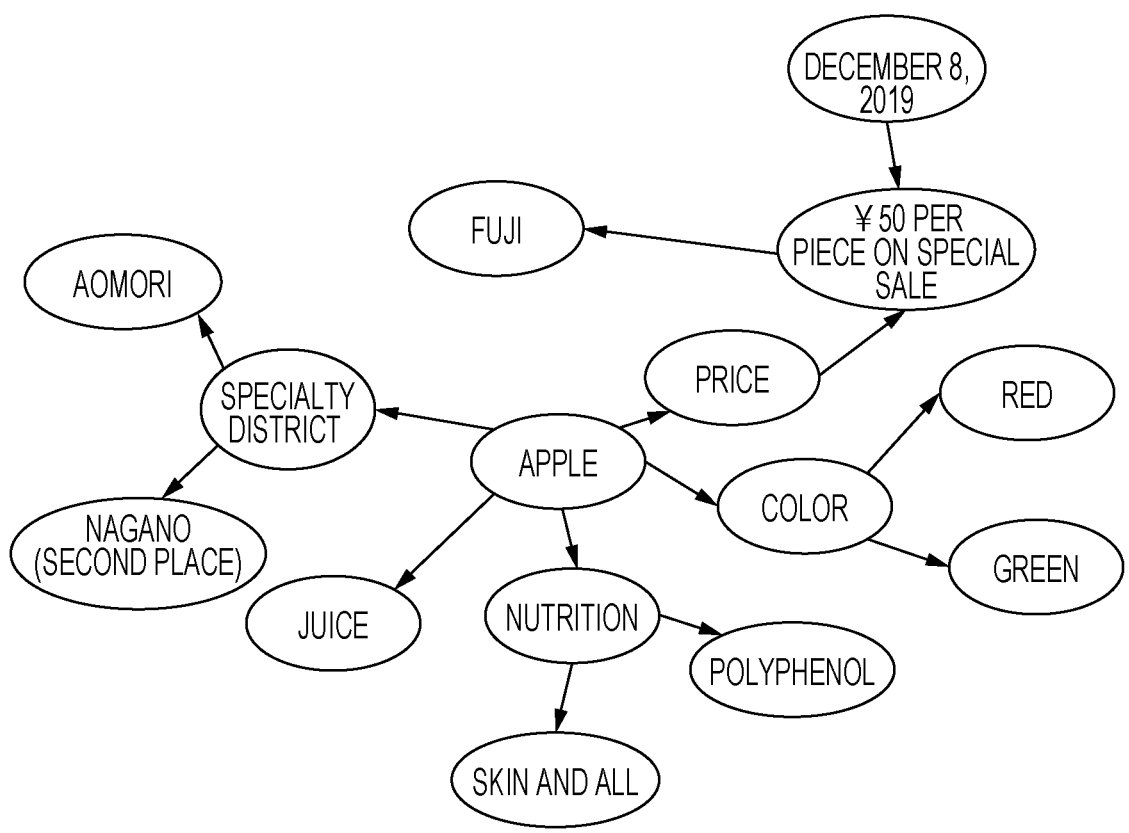
FIG. 14 illustrates an example of item search results provided by the server.

The search based on the structured information may start with multiple items. FIG. 14 illustrates an example of item search results by the server 10 in the structured information created by the user A. Referring to FIG. 14, the user specifies "apple" and "Dec. 8, 2019" and the server 10 searches items two tiers below and presents the hit items. The server 10 may thus present the search results based on the structured information with the search having started with multiple items.

The server 10 may perform search in accordance with the structured information with higher priority placed on items having more linking that is performed in accordance with the structured information created by another user. For example, when the structured information created by the user A is searched, the server 10 extracts only items matching the parent-child relationship in the structured information created by the users B and C and presents the items as the search results.

When the structured information created by the user is presented, the server 10 expresses the closeness in the relationship of the items by a distance between the items. The server 10 may thus store information related to the distance between the items in the relationship information table 600. When the structured information created by the user is presented, the server 10 may express the closeness in the relationship of the items by the thickness of a line drawn between the items. The server 10 may thus store information related to the thickness of the line between the items.

When the structured information created by the user is presented, the server 10 may set the location of each item to be modifiable in response to user operation. The server 10 may thus store in the item information table 500 information related to the location of each item, for example, coordinates of the location of the item.

When the structured information created by the user is presented, the server 10 may set a space defined by multiple arbitrary axes and present the structured information in a manner such that items are placed in the space of the axes.

In the exemplary embodiment described above, the CPU reads and executes the program to perform the structured information presentation process. One of a variety of processors other than the CPU may read and execute the program to perform the structured information presentation process. The processor may be a programmable logic device (PLD), modifiable in circuit configuration after manufacturing, such as a field-programmable gate array (FPGA). Also, the processor may be an application specific integrated circuit (ASIC) that is a dedicated electronic circuit specially designed to perform a specific process. The structured information presentation process may be performed by one of the processes or a combination of two or more processors of the same or different types (for example, a combination of multiple FPGAs or a combination of CPU and FGPA).

Specifically, the hardware structure of the variety of processors is an electrical circuit including circuit elements, such as semiconductor elements.

According to the exemplary embodiment, the process of the structured information presentation process is pre-stored (installed) on the ROM or storage. Alternatively, the program may be supplied on a recorded form on one of non-transitory computer readable media, including a compact disk read-only memory (CD-ROM), digital versatile disk read-only memory (DVD-ROM), and universal serial bus (USB) memory. The program may be downloaded from an external device via a network.

In the exemplary embodiment above, the term "processor" refers to hardware in a broad sense. Examples of the processor includes general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the exemplary embodiment above, the term "processor" is broad enough to encompass one processor or plural processors in collaboration which are located physically apart from each other but may work cooperatively. The order of operations of the processor is not limited to one described in the exemplary embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising
a processor configured to:
  acquire structured information created by a first user and structured information created by a second user, the structured information including structured contents having a parent-child relationship;
  while displaying, on a screen, the structured information created by the first user with the parent-child relationship of the structured contents being represented by a link having a direction from parent content to child content, receive an input to incorporate a new content in the displayed structured information; and
  upon receiving the input, display, on the screen, a suggestion of a content as a linking destination of the new content, wherein the linking destination of the new content is determined based on the acquired structured information including the structured information created by the second user, wherein:
the processor is configured to present the structured information in a manner that visually discriminates a status in which contents are linked from a status in which the linking of the contents is put on hold, and
the status in which the linking of the contents is put on hold changes color over time, and
after a predetermined period of time elapses, the status in which the linking of the contents is put on hold is cancelled.

2. The information processing apparatus according to claim 1, wherein the processor is configured to suggest the content as the linking destination of the new content in accordance with a content linked with the new content in the structured information created by the second user.

3. The information processing apparatus according to claim 2, wherein the processor is configured to suggest the content as the linking destination of the new content in accordance with a score that is calculated on a per content basis using details of the structured information created by the second user.

4. The information processing apparatus according to claim 3, wherein the processor is configured to calculate the score of the content as the linking destination such that the score is higher as a number of users linked in the structured information created by the second user is larger.

5. The information processing apparatus according to claim 1, wherein the processor is configured to suggest the content as the linking destination of the new content in accordance with an amount of evaluation that is performed on linking between contents related to the new content in the structured information created by the second user.

6. The information processing apparatus according to claim 1, wherein the processor is configured to suggest the content as the linking destination of the new content in accordance with results of analyzing details of the new content.

7. The information processing apparatus according to claim 1, wherein the processor is configured to present the structured information created by the first user in a manner that discriminates the structured information created by the first user from the structured information created by the second user.

8. The information processing apparatus according to claim 1, wherein the processor is configured to present, if a content unlinked with the contents is present in the structured information, the unlinked content in a manner that discriminates the unlinked content from the other contents.

9. The information processing apparatus according to claim 8, wherein the processor is configured to output, if a quantity of contents unlinked with any of the contents in the structured information is a specific value or more, a notification to urge linking of the unlinked contents.

10. The information processing apparatus according to claim 1, wherein the processor is configured to present a relationship of the contents by a line indicating a linking of the contents in the structured information.

11. An information processing method to be performed by an information processing apparatus, the method comprising:
  acquiring structured information created by a first user and structured information created by a second user, the structured information including structured contents having a parent-child relationship;
  while displaying, on a screen, the structured information created by the first user with the parent-child relationship of the structured contents being represented by a link having a direction from parent content to child content, receiving an input to incorporate a new content in the displayed structured information; and
  upon receiving the input, display, on the screen, a suggestion of a content as a linking destination of the new content, wherein the linking destination of the new content is determined based on the acquired structured information including the structured information created by the second user, wherein:

the information processing apparatus presents the structured information in a manner that visually discriminates a status in which contents are linked from a status in which the linking of the contents is put on hold, and the status in which the linking of the contents is put on hold changes color over time, and after a predetermined period of time elapses, the status in which the linking of the contents is put on hold is cancelled.

12. A non-transitory computer readable medium storing a program causing a computer to execute a process for processing information, the process comprising:

acquiring structured information created by a first user and structured information created by a second user, the structured information including structured contents having a parent-child relationship;

while displaying, on a screen, the structured information created by the first user with the parent-child relationship of the structured contents being represented by a link having a direction from parent content to child content, receive an input to incorporate a new content in the displayed structured information; and upon receiving the input, display, on the screen, a suggestion of a content as a linking destination of the new content, wherein the linking destination of the new content is determined based on the acquired structured information including the structured information created by the second user, wherein:

the computer presents the structured information in a manner that visually discriminates a status in which contents are linked from a status in which the linking of the contents is put on hold, and the status in which the linking of the contents is put on hold changes color over time, and after a predetermined period of time elapses, the status in which the linking of the contents is put on hold is cancelled.

13. The information processing apparatus according to claim 1, wherein:

the link having the direction is an arrow-headed solid line from the parent content to the child content, and a line that has a different form from the arrow-headed solid line is displayed to suggest a new link between two contents currently displayed.

14. The information processing apparatus according to claim 1, wherein:

the link having the direction is an arrow-headed solid line from the parent content to the child content, and a text message suggesting the content as the linking destination of the new content is displayed.

* * * * *